United States Patent
Akasaka (10) Patent No.: US 8,873,950 B2
(45) Date of Patent: Oct. 28, 2014

(54) METHOD AND SYSTEM OF AUTOMATIC REGENERATION OF OPTICAL SIGNALS

(75) Inventor: Youichi Akasaka, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 432 days.

(21) Appl. No.: 13/252,814

(22) Filed: Oct. 4, 2011

(65) Prior Publication Data

US 2013/0084064 A1    Apr. 4, 2013

(51) Int. Cl.
| | |
|---|---|
| H04B 10/08 | (2006.01) |
| H04J 14/02 | (2006.01) |
| H04J 14/00 | (2006.01) |
| H04B 10/079 | (2013.01) |
| H04B 10/29 | (2013.01) |

(52) U.S. Cl.
CPC ........... *H04J 14/0221* (2013.01); *H04J 14/021* (2013.01); *H04B 10/0795* (2013.01); *H04B 10/29* (2013.01); *H04J 14/0256* (2013.01)
USPC .................. 398/34; 398/9; 398/25; 398/175; 398/177

(58) Field of Classification Search
CPC ....................... H04B 10/07955; H04B 10/0777
USPC .................................. 398/9, 25, 34, 175, 177
See application file for complete search history.

(56) References Cited

U.S. PATENT DOCUMENTS

| | | | | |
|---|---|---|---|---|
| 8,391,711 | B2 * | 3/2013 | Iwasawa et al. ................. | 398/62 |
| 2002/0080447 | A1 * | 6/2002 | Fells et al. ..................... | 359/141 |
| 2003/0118347 | A1 * | 6/2003 | Papaparaskeva et al. ..... | 398/147 |
| 2005/0052727 | A1 * | 3/2005 | Kilper et al. .................. | 359/334 |
| 2005/0053377 | A1 * | 3/2005 | Yoo ................................ | 398/79 |
| 2007/0065159 | A1 * | 3/2007 | Kuksenkov et al. .......... | 398/175 |
| 2007/0110452 | A1 * | 5/2007 | Uda et al. ...................... | 398/177 |
| 2007/0206955 | A1 * | 9/2007 | Uda et al. ...................... | 398/177 |
| 2008/0085125 | A1 * | 4/2008 | Frankel ......................... | 398/159 |
| 2009/0162060 | A1 * | 6/2009 | Vasseur et al. ................. | 398/49 |
| 2009/0227201 | A1 * | 9/2009 | Imai et al. ......................... | 455/7 |
| 2009/0269065 | A1 * | 10/2009 | Bardalai et al. ................. | 398/79 |

OTHER PUBLICATIONS

Li et al.; "All-optical 2R Regeneration Using Data-pumped Fibre Parametric Amplification"; Electronic Letters, vol. 39, No. 17; pp. 2, 2003.
Croussore et al.; "All-optical Regeneration of Differential Phase-shift Keying Signals Based on Phase-sensitive Amplification"; Optics Letters, vol. 29, No. 20; pp. 3, 2004.
MDI; "eyeD 360 monitor addresses multi-impairments in-service"; Monitoring Division Inc.; www.mdi.com ; pp. 2, 2008.

* cited by examiner

*Primary Examiner* — Oommen Jacob
(74) *Attorney, Agent, or Firm* — Baker Botts L.L.P.

(57) ABSTRACT

In accordance with the present disclosure, disadvantages and problems associated with transmitting high capacity (e.g., 400 G) optical signals may be reduced. In accordance with an embodiment of the present disclosure a method for regenerating an optical signal comprises receiving an optical signal at a network element and measuring a performance characteristic of the optical signal. The method further comprises determining that the optical signal needs regeneration based on the performance characteristic of the optical signal. The method additionally comprises performing signal regeneration of the optical signal based on the determination that the optical signal needs regeneration.

22 Claims, 5 Drawing Sheets

METHOD AND SYSTEM OF AUTOMATIC REGENERATION OF OPTICAL SIGNALS

TECHNICAL FIELD

The present disclosure relates generally to optical networks and, more particularly, to a system and method of automatic regeneration of optical signals.

BACKGROUND

Telecommunications systems, cable television systems and data communication networks use optical networks to rapidly convey large amounts of information between remote points. In an optical network, information ("traffic") is conveyed in the form of optical signals through optical fibers. The optical signals may comprise a beam of light having a specific wavelength and having the traffic modulated onto the beam. In some instances a wavelength configured to carry information may be referred to as an "optical channel" or a "channel." Each channel may be configured to carry a certain amount of information through an optical network at a particular data rate.

To increase the information carrying capabilities of an optical network, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Additionally, various modulation techniques may be used to increase the amount of traffic that may be carried by a particular channel.

However, the techniques used to increase the amount of traffic carried by an optical signal may introduce new challenges in implementing such networks. For example, a high capacity (e.g., a 400 Gigabits/second (400 G)) optical signal may have more stringent performance requirements (e.g., a higher Optical Signal to Noise Ratio (OSNR) requirement). Current methods of compensating for the more stringent performance requirements of high capacity optical signals may be costly and inefficient.

SUMMARY

In accordance with the present disclosure, disadvantages and problems associated with transmitting high capacity (e.g., 400 G) optical signals may be reduced. In accordance with an embodiment of the present disclosure a method for regenerating an optical signal comprises receiving an optical signal at a network element and measuring a performance characteristic of the optical signal. The method further comprises determining that the optical signal needs regeneration based on the performance characteristic of the optical signal. The method additionally comprises performing signal regeneration of the optical signal based on the determination that the optical signal needs regeneration.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
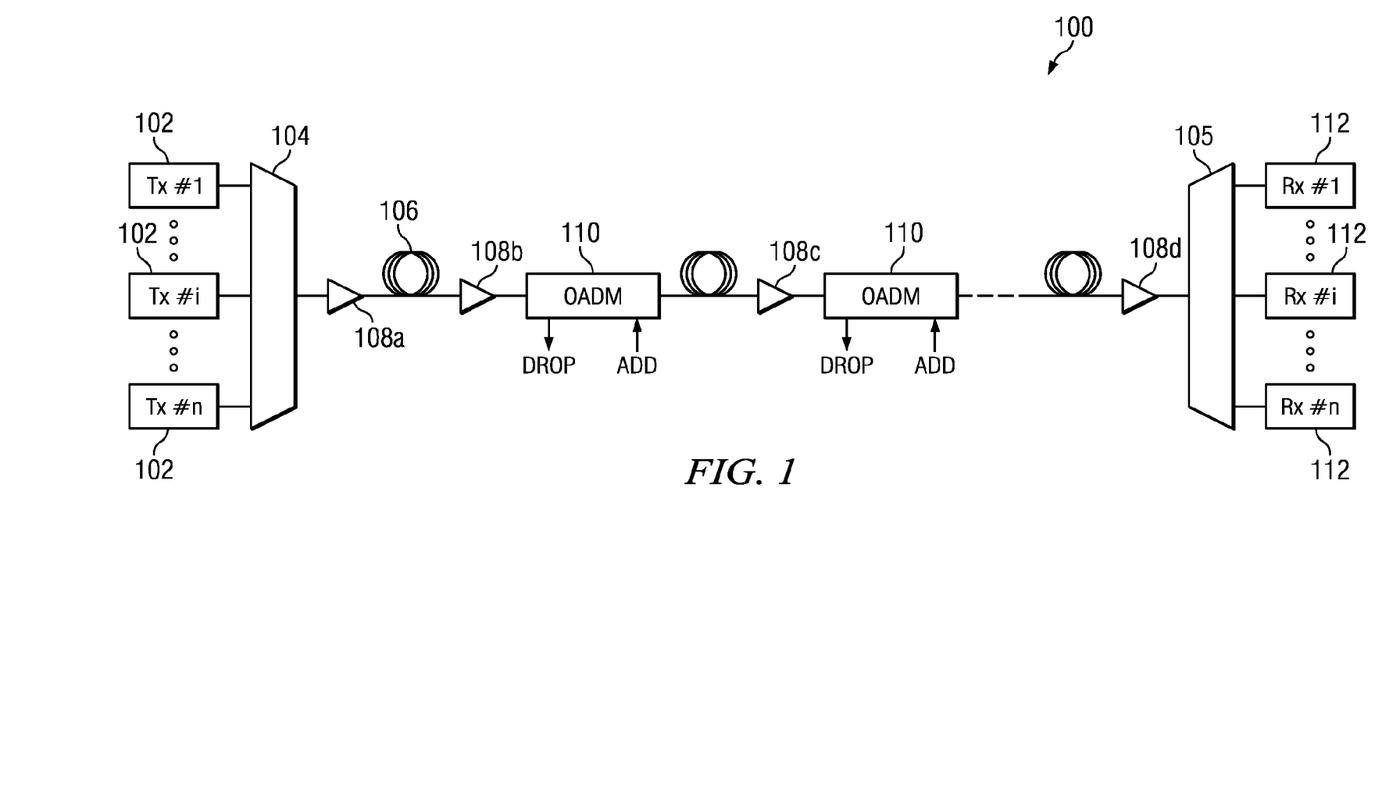
FIG. 1 illustrates an example embodiment of an optical network, in accordance with some embodiments of the present disclosure.

FIG. 1 illustrates an example embodiment of an optical network 100, in accordance with some embodiments of the present disclosure. As discussed in further detail below, a network element of optical network 100 (e.g., optical add/drop modules (OADMs) 110) may be configured to automatically regenerate optical signals upon receiving the optical signals. In the same or alternative embodiments, the network element may be configured to monitor the optical performance of optical signals propagating through optical network 100. If the performance of an optical signal does not satisfy a threshold for the optical signal, the network element may be configured to regenerate the optical signal to allow the signal to continue propagating through optical network 100 and reach its intended destination. Unlike traditional techniques, the signal regeneration process of the present disclosure may dynamically determine whether or not a signal needs regeneration based on the measured optical performance whereas traditional signal regeneration techniques and designs may be based on specific network properties (e.g., fiber types, span length, etc.) and require that the signal regeneration process be designed in a preset, static manner. In some instances, such dynamic implementations described in the present disclosure may allow for a more cost effective implementation and/or upgrade of an optical network.

Optical network 100 may include one or more optical fibers 106 configured to transport one or more optical signals communicated by network elements of optical network 100. A network element may refer to any number of components that an optical signal may pass through while propagating through optical network 100. The network elements of optical network 100 may be coupled together by fibers 106, may comprise one or more transmitters 102, one or more multiplexers (MUX) 104, one or more amplifiers 108, one or more OADMs 110, and one or more receivers 112.

Optical network 100 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical network 100 may include devices configured to transmit optical signals over fibers 106. Information may be transmitted and received through network 100 by modulation of one or more wavelengths of light to encode the information on the wavelength. In optical networking, a wavelength of light may also be referred to as a channel. Each channel may be configured to carry a certain amount of information through optical network 100 at a certain data rate.

The data rate of a channel may be related to the modulation technique used for the particular channel. For example, in 10 Gigabits/second (10 G) Ethernet applications, on-off keying (OOK) may be utilized to convey information using two modulation levels. In a 40 G Ethernet application, Quadrature Phase-shift Keying (QPSK) may be used to convey information using four modulation levels to increase the information carrying capabilities of a channel over a two level modulation technique such as OOK. Further, in a 100 G Ethernet application, Dual-polarization QPSK (DP-QPSK) may be used to convey information using four modulation levels for two polarization states to further increase the information carrying capabilities of a channel. Additionally, to implement a 400 G Ethernet application, orthogonal frequency-division multiplexing (OFDM), Nyquist wavelength division multiplexing (WDM) or narrowed channel spacing WDM may be applied to a dual-polarization 16 quadrature amplitude modulation (DP-16-QAM) format or a dual-polarization 16 phase-shift keying (DP-16-PSK) format. Therefore, various modulation techniques and formats may be used to increase the spectral efficiency of a channel, which may also increase the information carrying capabilities of network 100.

To further increase the information carrying capabilities of optical network 100, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the data rate of solely one channel. With more bandwidth, optical networks are capable of transmitting greater amounts of information. Optical network 100 may be configured to transmit disparate channels using WDM, DWDM, or some other suitable multi-channel multiplexing technique, and to amplify the multi-channel signal.

The transmission band of network 100 may refer to a portion of the optical spectrum that includes a range of wavelengths that network 100 is configured to operate within. For example the transmission band in North America may be referred to as the C-band and may include optical wavelengths between approximately 1525 and 1565 nanometers (nm). Therefore, an optical signal transmitted in the C-band may include wavelengths between approximately 1525 and 1565 nm.

Channel power may be related to the optical signal to noise ratio (OSNR) of network 100. The OSNR may relate to the ratio of signal power with respect to noise that may corrupt the signal. The signal power of each channel may need to be sufficiently high to overcome the noise such that the traffic carried by the signal may be extracted from the signal.

The OSNR may be a function of signal propagation distance. As optical signals propagate, the amount of noise affecting the signal may increase with the distance travelled by the signal and/or the number of network elements that the signal may pass through. For example, as a signal propagates from one network element to another via a fiber 106, the signal power may experience span loss while propagating through the fiber 106. Additionally, an amplifier 108 (described further below) may introduce noise through amplification. Further, as the signal passes through various other network elements, each network element may introduce other noise. Accordingly, the power of an optical signal travelling long distances and/or passing through more network elements may need to be higher than the power of an optical signal travelling shorter distances and/or through fewer network elements to maintain a sufficiently high OSNR.

Additionally, different modulation formats may be more sensitive to noise, such that the OSNR requirements for the different modulation techniques may vary. Accordingly, the distances optical signals may travel before requiring signal regeneration may vary depending on the modulation format used for a particular signal. The distance that an optical signal may be able to travel without requiring regeneration may be referred to as the optical reach of the signal. As mentioned above, different modulation formats may be used to achieve different data carrying capacities, such that the reach of signals with different capacities may vary. For example, the reach of a 400 G signal may be smaller than that of a 10 G or 100 G signal. Therefore, a 400 G signal may require more frequent signal regeneration than a 10 G or 100 G signal traveling the same distance due to the differences in the modulation formats that may be used.

Signal routing may be designed with destination and transmission distances preset. Traditional techniques may additionally preset the network elements between the origination point and destination of an optical signal for optical to electrical to optical (O-E-O) regeneration of the signal based on the reach of the signal. However, if a network element is upgraded to transmit another type of signal (e.g., inserting a 400 G card to enable the network element to transmit a 400 G signal), the location of needed regeneration points of the new type of signal may differ from those of the other signals because of the different reaches associated with the different signals. For example, a 400 G signal may need more regeneration points than a 100 G signal due to the reduced reach of a 400 G signal as compared to a 100 G signal.

Therefore, as described in further detail below, one or more network elements (e.g., OADMs 110) may be configured to receive an optical signal of a certain type (e.g., a 400 G signal) and determine whether or not to regenerate the optical signal regardless of any preset regeneration points that may be associated with another type of optical signal (e.g., a 100 G signal). Such an implementation may simplify upgrading optical network 100.

For example, a network element may receive a 100 G signal and a 400 G signal. Optical network 100 may have been previously designed with preset regeneration points associated with the 100 G signal. If the network element is not one of those regeneration points, the network element may recognize that the 100 G signal is a 100 G signal and may direct the 100 G signal to another network element without performing any signal regeneration. If the network element is one of the preset regeneration points, the network element may recognize the 100 G signal and automatically regenerate the 100 G signal (e.g., perform O-E-O regeneration) based on its preset design.

In contrast, upon receiving the 400 G signal, the network element may recognize that it is a 400 G signal and may measure an optical signal performance characteristic of the 400 G signal. Based on that measurement, the network element may determine whether or not to perform signal regeneration before directing the 400 G signal to the next network element. Therefore, optical network 100 employing such network elements may be configured to be upgraded from being 100 G compatible to being 400 G compatible without having to implement and determine another set of preset regeneration points for the 400 G signal, which may be required by the differences in reach between 100 G and 400 G signals. In other words, the preset regeneration points for the 100 G signals may be used for the 400 G signals also, and the dynamic regeneration may compensate for the decreased reach of the 400 G signals as compared to the 100 G signals.

Additionally, in some embodiments, the regeneration of the 400 G signal may be performed in the optical domain without performing an O-E-O conversion. Reducing the number of O-E-O regenerations may also reduce costs. It is understood that the above example is just that and that the present disclosure is not limited to instances where 400 G capabilities are being introduced in 100 G networks.

Further, when designing and implementing a new optical network, configuring all the network elements to perform automatic signal regeneration may simplify the design of the network instead of creating preset regeneration points. Accordingly, the dynamic regeneration of network 100 may allow for more flexibility than traditional methods with respect to implementing network 100 as a new optical network and implementing new types of optical signals in an existing optical network 100 (e.g., implementing 400 G signals in an existing optical network).

Optical network 100 may include one or more optical transmitters (Tx) 102 configured to transmit optical signals through optical network 100 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 100 according to the required power levels of each channel as determined by manager 120. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed without opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA). However, any other suitable amplifier, such as a semiconductor optical amplifier (SOA), may be used.

OADMs 110 may be coupled to network 100 via fibers 106 also. OADMs 110 comprise an add/drop modules, which may include any system, apparatus or device configured to add and/or drop optical signals from fibers 106. For example, OADMs may be reconfigurable add/drop multiplexers (ROADMs). After passing through an OADM 110, a signal may travel along fibers 106 directly to a destination, or the signal may be passed through one or more additional OADMs 110 before reaching a destination. Although not expressly shown. In the present disclosure, OADMs 110 may be configured to perform automatic signal regeneration of optical signals received at OADMs 110, as described in further detail below.

Network 100 may also include one or more demultiplexers 105 at one or more destinations of network 100. Demultiplexer 105 may comprise any system apparatus or device that may act as a demultiplexer by splitting a single WDM signal into its individual channels. In some embodiments, demultiplexer 105 may comprise a multiplexer 104 but configured to split WDM signals into their individual channels instead of combine individual channels into one WDM signal. For example, network 100 may transmit and carry a forty channel DWDM signal. Demultiplexer 105 may divide the single, forty channel DWDM signal into forty separate signals according to the forty different channels.

Network 100 may also include optical receivers 112 coupled to demultiplexer 105. Each receiver 112 may be configured to receive signals transmitted in a particular wavelength or channel, and process the signals for the information that they contain.

Modifications, additions or omissions may be made to network 100 without departing from the scope of the disclosure. For example, in some embodiments, each channel in optical network 100 may have the same data rate and in other embodiments one or more channels may have different data rates (e.g., 10 G, 40 G, 100 G, 400 G, etc.). Further, network 100 may include more or fewer elements than those depicted. Additionally network 100 may include additional elements not expressly shown, such as a dispersion control module. Also, as mentioned above, although depicted as a point to point network, network 100 may comprise any suitable network for transmitting optical signals such as a ring or mesh network.

Figure 2:
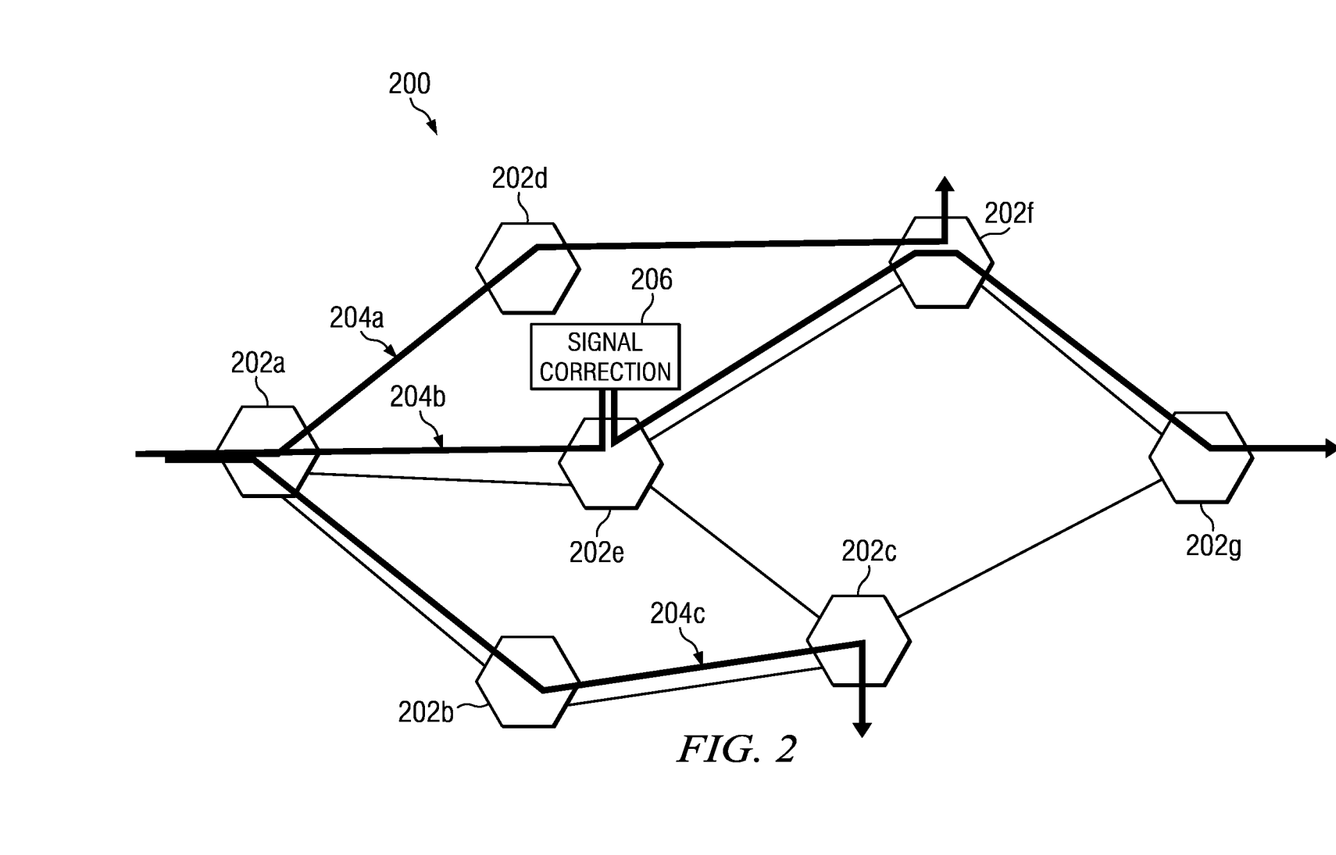
FIG. 2 illustrates an example of an optical network configured to automatically regenerate optical signals, in accordance with some embodiments of the present disclosure.

FIG. 2 illustrates an example of an optical network 200 including network elements 202 configured to automatically regenerate optical signals, in accordance with some embodiments of the present disclosure. Network elements 202 may be substantially similar to the network elements of network 100 described above. For example, network elements 202 may be configured to add and/or drop signals associated with network 200 and may include OADMs 110 of FIG. 1.

In the present embodiment, network elements 202 may be configured to transmit a plurality of optical signals 204 through network 200. In the present example, network element 202a may be configured to direct an optical signal 204a from network element 202a to network element 202d. Network element 202d may be configured to direct optical signal 204a to network element 202f where optical signal 204a may be dropped from network 200. Network element 202a may be configured to direct an optical signal 204b to network element 202e, which may direct optical signal 204b to network element 202f. Network element 202f may be configured to direct optical signal 204b to network element 202g, which may drop optical signal 204b from network 200. Similarly, network element 202a may direct an optical signal 204c to network element 202b, which may direct optical signal 204c to network element 202c. In the present example, network element 202c may drop optical signal 204c from network 200.

According to some embodiments of the present disclosure, network elements 202 may each be configured to perform optical performance monitoring on the optical signals 204 received by the network elements. Based on the performance monitoring, the network element 202 may determine whether or not to perform optical signal regeneration of one or more channels of the optical signal 204 before communicating the optical signal 204 to another network element 202.

For example, upon receiving optical signal 204b from network element 202a, network element 202e may monitor the optical performance of optical signal 204b. Network element 202e may monitor the optical performance of optical signal 204b to determine whether optical signal 204b is sufficiently degraded such that signal regeneration of optical signal 204b may be advantageous before communicating optical signal 204b from network element 202e to network element 202f. Similarly, network elements 202d and 202b may monitor the optical performance of optical signals 204a and 204c, respectively, before communicating optical signals 204a and 204c to network elements 202f and 202c, respectively.

The performance monitoring may monitor the OSNR, polarization mode dispersion (PMD), second-order PMD (SOPMD), chromatic dispersion, phase noise, polarization dependent loss (PDL), an eye opening associated with the optical signal, a bit error rate (BER) of the optical signal, or any other applicable performance characteristic of an optical signal 204. Any suitable system, apparatus, or device may be used to measure one or more of these characteristics. For example, in some instances the PMD monitoring may be accomplished through partial side-band filtering and OSNR monitoring may be accomplished using an interferometer. Additionally, a device such as the eyeD 360 monitor by monitoring division inc. (mdi) may be used to monitor one or more of these performance characteristics. In some embodiments the performance monitoring may be performed by an optical spectrum analyzer configured to analyze performance characteristics (e.g., OSNR, PMD, etc.) of each individual channel of the optical signal 204.

In the present example, network elements 202d and 202b may determine, based on the performance monitoring, not to regenerate optical signals 204a and 204c, respectively. Accordingly, network elements 202d and 202b may direct optical signals 204a and 204c, respectively, to network elements 202f and 202c, respectively, without performing signal regeneration. However, in the present example, network element 202e may determine that optical signal 204b may be regenerated by a signal correction unit 206 (described in further detail with respect to correction units 306 and 406 of FIGS. 3 and 4) before being directed to network element 202f, based on the performance monitoring of optical signal 204b. Accordingly, correction unit 206 of network element 202e may perform signal regeneration of optical signal 204b before network element 202e communicates optical signal 204b to network element 202f. As mentioned above, in some instances, the regeneration process used may be done in the optical domain instead of requiring an O-E-O conversion of the optical signal 204.

In some embodiments, network elements 202 may determine whether or not to regenerate an optical signal 204 based on comparing a threshold value of a performance characteristic with the measured value of the performance characteristic. For example, network elements 202 may compare the OSNR of an optical signal 204 with a threshold value for the OSNR. The threshold value may be based on whether the optical signal 204 quality (as measured by the performance characteristic) is sufficiently high for the optical signal 204 to arrive at its intended destination from the network element 202 (e.g., the next network element 202) with a sufficient degree of quality. Accordingly, the threshold may vary depending on the reach of the optical signal 204, the distance from the network element 202 that is transmitting the optical signal 204 to the network element 202 that is to receive the optical signal 204, the properties of the fibers between the network elements 202, eye-opening associated with the signal, bit error rate (BER) or any other applicable characteristic.

The threshold may vary on the distance between network elements 202 because the reach of an optical signal 204 may be sufficiently large for the optical signal 204 to reach one network element 202 but not sufficiently large for the optical signal 204 to reach another network element 202.

For example, the distance from network element 202d to network element 202f may be different than the distance from network element 202e to network element 202f. Therefore, the threshold value for determining whether or not to regenerate optical signal 204a at network element 202d before transmitting optical signal 204a to network element 202f may be different from the threshold value for determining whether or not to regenerate optical signal 204b at network element 202e before transmitting optical signal 204b to network element 202f. Additionally, the distance from network element 202e to network element 202c may be different than the distance from network element 202e to network element 202f. Consequently, the threshold for optical signals 204 being transmitted from network element 202e to network element 202c may be different than the threshold for optical signals 204 being transmitted from network element 202e to network element 202f.

Additionally, in some instances the network elements 202 may determine whether or not to perform signal regeneration based on the signal type of an optical signal 204. Such embodiments may be employed for upgrading an optical network (e.g., upgrading an optical network for transmitting 400 G signals). For example, optical signal 204a may be a 100 G signal and optical network 200 may have preset regeneration points for 100 G signals. Network element 202d may be configured to recognize that optical signal 204a is a 100 G signal and may not be a preset regeneration point of optical signal 204a and thus may not regenerate optical signal 204a. In contrast, optical signal 204b may be a 400 G signal and optical network 200 may not have preset regeneration points for 400 G signals. Therefore, upon receiving optical signal 204b from network element 202a, network element 202e may measure a performance characteristic of optical signal 204b and may determine whether or not to perform regeneration of optical signal 204b based on the measured performance characteristic. As mentioned above, this determination may be made based on a threshold associated with the measured performance characteristic of optical signal 204b.

In some embodiments each network element 202 may be configured to receive an optical signal 204 and determine an intended destination of the optical signal 204 from the network element 202. For example, the intended destination may be another network element 202, or the optical signal 204 may be dropped from network 200 such that the intended destination may be a receiver configured to extract the information modulated on the signal 204. The network element 202 may be configured to determine the threshold value for the optical signal 204 based on to the intended destination of the optical signal 204 from the network element 202. In some embodiments, a threshold associated with transmitting an optical signal 204 from one network element 202 to another may be determined by and transmitted to the network elements 202 from a network manager (not expressly shown) of optical network 200 communicatively coupled to the network elements 202.

As an example, if the intended destination is another network element 202, as mentioned above, the threshold may be based on various factors such as distance between the network elements 202, the reach of the optical signal 204, etc. As another example, if the intended destination is a receiver, the threshold may be based on the ability of the receiver to read the optical signal 204.

The signal regeneration process may be an O-E-O regeneration process or may be an optical regeneration process. In instances where optical regeneration is used, the process may vary depending on the modulation format used for the optical signal 204. For example, an amplified spontaneous emission (ASE) removal process using a non-linear loop mirror or a storable absorber may be implemented to optically regenerate a signal with an amplitude shift-eying (ASK) modulation format. As another example, a phase noise removal process may be used to optically regenerate a binary phase-shift keying (BPSK) modulation format. Other examples of optical signal regeneration are PMD and polarization dependent loss (PDL) compensation through degree of polarization (DOP) maximizing, clock recovery (e.g., aligning the receiving timing of signals) and inserting delay on a specific wavelengths to reduce cross-phase modulation (XPM), which may be used for a variety of modulation formats. In some instances, the optical signal regeneration process may also compensate for chromatic dispersion and/or signal power amplification.

The implementations of various optical regeneration processes may be such that different regeneration units (described in further detail below) implementing different processes may have different bandwidths. For example, an increase in power of a signal pump used in an optical parametric regeneration process may increase the effective bandwidth of the unit implementing the process and a decrease in signal pump power may decrease the effective bandwidth of the unit implementing the process. Accordingly, different numbers of regeneration units may be used to cover the optical spectrum of the transmission band of optical network 200 depending on the bandwidth of each regeneration unit.

For example, a regeneration unit may have a bandwidth that covers the entire optical spectrum of optical signals transmitted within optical network 200 (e.g., a regeneration unit may have a bandwidth that covers the entire C-band). Such a regeneration unit may accordingly be configured to perform optical signal regeneration on every channel within the transmission band of optical network 200 such that the unit may perform a full-band based regeneration. As an example, a regeneration unit that utilizes ASE removal as a regeneration process may be a full-band regeneration unit. However, an ASE removal regeneration unit may also be implemented as a partial-band (e.g., channel based) regeneration unit, as described below.

Other regeneration units may have a bandwidth such that the regeneration unit may be configured to regenerate portions of the optical spectrum of the transmission band of optical network 200. A portion of the optical spectrum may include one channel or a plurality of channels. These regeneration units may accordingly perform partial-band based regeneration on channels with wavelengths that fall within the portion of the transmission band associated with a respective regeneration unit. In such embodiments, a network element 202 may include multiple partial-band based regeneration units to cover the entire transmission band of optical signals within network 200. As ways of example, regeneration units that utilize PMD, PDL, XPM, or clock recovery may be implemented as partial-band (e.g., channel based) units.

Figure 3:
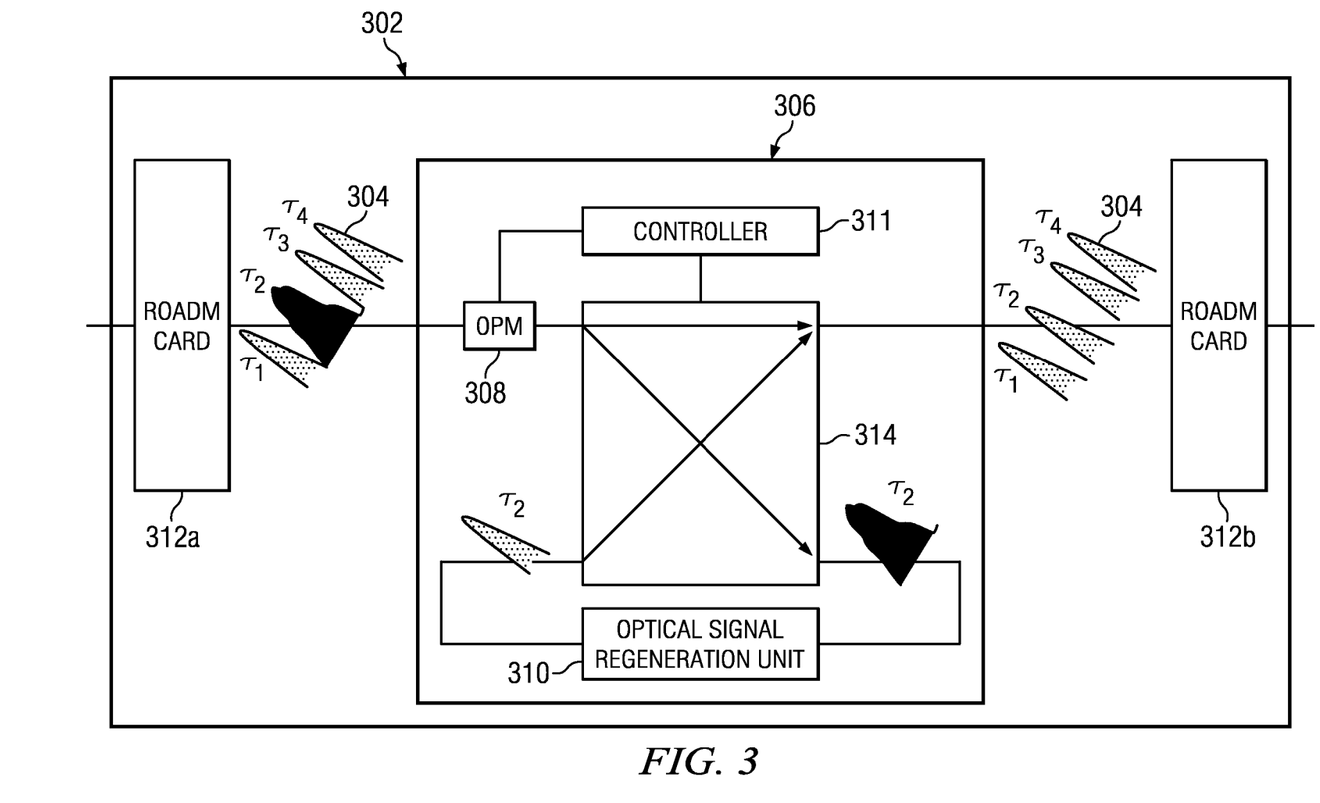
FIG. 3 illustrates an example of a network element of an optical network configured to automatically regenerate optical signals, in accordance with some embodiments of the present disclosure.
Figure 4:
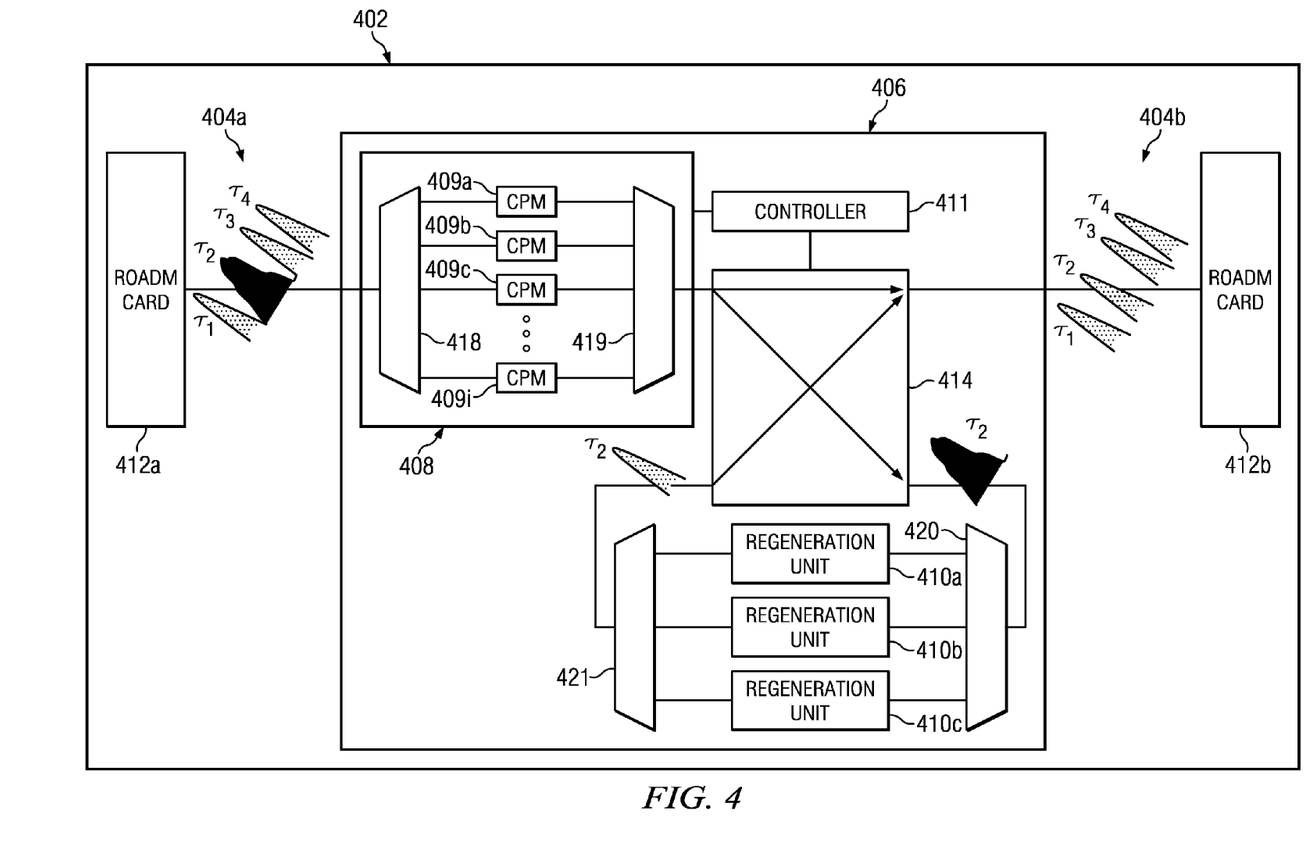
FIG. 4 illustrates another example of a network element of an optical network configured to automatically regenerate optical signals, in accordance with some embodiments of the present disclosure.

Accordingly, a network element 202 may be configured to perform performance monitoring and/or signal correction using one or more regeneration units that employ a full-band, partial-band or channel based solution. As mentioned above, the bandwidth of the regeneration units may depend on the regeneration process used and its particular implementation, which may be based on the modulation format of an optical signal 204. In the present disclosure, FIG. 3 illustrates an example network element with a full-band regeneration unit and FIG. 4 illustrates an example network element that includes a plurality of partial-band regeneration units. In some embodiments, the partial-band regeneration units may be channel based.

Modifications, additions or omissions may be made to FIG. 2 without departing from the scope of the present disclosure. For example, the number of network elements and optical signals depicted are for illustrative purposes only. Additionally, although optical network 200 is depicted as a mesh network, it is understood that the principles described may be used for any suitable optical network.

FIG. 3 illustrates a network element 302 with a full-band regeneration unit configured to perform automatic signal correction of a WDM signal 304. Network element 302 may be a ROADM and may be configured to receive WDM signal 304 at a ROADM card 312a. Network element 302 may also include a signal correction unit 306 configured to perform automatic signal correction of WDM signal 304.

WDM signal 304 may include a plurality of channels ($\lambda_i$) and each channel ($\lambda_i$) may be associated with a data rate and its associated modulation format. For example, WDM signal 304 may include channels $\lambda_1$-$\lambda_4$ (among others). In some embodiments each channel $\lambda_1$-$\lambda_4$ may be configured for 400 G signals, 100 G signals, 40 G signals, 10 G signals or any other suitable optical signal type. It is understood that in the present disclosure, referring to a "channel" may also refer to the optical signal being carried by the wavelength associated with the particular channel.

Signal correction unit 306 may comprise any suitable system, apparatus, or device configured to monitor the optical performance of one or more channels of WDM signal 304 and perform regeneration of one or more channels of WDM signal 304 based on the measured signal performance. Correction unit 306 may include an optical performance monitoring (OPM) unit 308, a wavelength selective switch (WSS) 314, and an optical signal regeneration unit 310.

OPM 308 may comprise any suitable system, apparatus, or device configured to monitor a performance characteristic of an optical signal. In the present example, OPM 308 may be configured to monitor PMD, OSNR or any other applicable performance characteristic of one or more channels of WDM signal 304 as described above with respect to the monitoring of optical signals 204 of FIG. 2. In some instances, OPM 308 may be configured to monitor the performance of all of WDM signal 304, a subset of channels of WDM signal 304 or each individual channel ($\lambda_i$) of WDM signal 304.

Correction unit 306 may also include a controller 311 communicatively coupled to OPM 308. Controller 311 may comprise any system, device, or apparatus configured to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, the controller may interpret and/or execute program instructions and/or process data (e.g., instructions to monitor and interpret performance characteristics) stored in memory communicatively coupled to the controller.

Memory may comprise any system, device or apparatus operable to retain program instructions or data for a period of time (e.g., computer-readable media). Memory may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to correction unit 306 is turned off. Although shown as a single unit, it is understood that network element 302 may include any number of controllers 311 configured to perform one or more of the operations described with respect to controller 311. Additionally, controller 311 may be located in any appropriate location of network element 302 (e.g., may be included in OPM 308).

Controller 311 may be configured to determine whether or not to perform signal regeneration on one or more channels of WDM signal 304 based on the measured performance characteristic of the channels of WDM signal 304, as measured by OPM 308. For example, controller 311 may compare the performance characteristic (e.g., OSNR, PMD, etc.) with a threshold value, as described above with respect to FIG. 2. If the performance characteristics for one or more channels do not meet the threshold value (e.g., OSNR is below the threshold value) controller 311 may communicate a control signal to WSS 314 to direct WSS 314 to select the one or more degraded channels to be sent to signal regeneration unit 310.

Additionally, OPM 308 may be configured to detect the type of signal (e.g., 100 G or 400 G) a channel of WDM signal 304 may be associated with and controller 311 may be configured to determine the detected signal type. The signal type may be based on the modulation format of the signal and controller 311 and OPM 308 may be configured to distinguish between different modulation formats. Controller 311 may direct that operations be performed with respect to the channel types accordingly. For example, in some embodiments, signal correction unit 306 may be configured to perform dynamic regeneration of 400 G signals but not 100 G signals and, in the present example, channels $\lambda_1$-$\lambda_3$ may be configured for 400 G signals and channel $\lambda_4$ may be configured for 100 G signals. In such instances, controller 311 may determine that channels $\lambda_1$-$\lambda_3$ are 400 G channels and may accordingly perform operations related to performance monitoring and signal regeneration of channels $\lambda_1$-$\lambda_3$ (as described above and disclosed further below) based on this determination. Additionally, controller 311 may determine that channel $\lambda_4$ is associated with 100 G signals and may accordingly direct WSS 314 to pass channel $\lambda_4$ along to ROADM card 312b without performing operations related to performance monitoring and signal regeneration of channel $\lambda_4$.

As another example, in alternative embodiments, signal correction unit 304 may be configured to perform dynamic regeneration of both 400 G signals and 100 G signals and, in the present example, channels $\lambda_1$-$\lambda_3$ may be configured for 400 G signals and channel $\lambda_4$ may be configured for 100 G signals. In such instances, controller 311 may determine that channels $\lambda_1$-$\lambda_3$ are 400 G channels and may accordingly perform operations related to performance monitoring and signal regeneration of 400 G channels $\lambda_1$-$\lambda_3$ (as disclosed further below) based on this determination (e.g., controller 311 may instruct WSS 314 to direct a degraded 400 G channel $\lambda_1$, $\lambda_2$, and/or $\lambda_3$ to an optical signal regeneration unit 310 configured for 400 G signals). Additionally, controller 311 may determine that channel $\lambda_4$ is associated with 100 G signals and may accordingly perform operations related to performance monitoring and signal regeneration of 100 G channel $\lambda_4$ (e.g., controller 311 may instruct WSS 314 to direct a degraded channel $\lambda_4$ to a regeneration unit 310 configured for 100 G signals (which may be different than a regeneration unit configured for 400 G signals)).

Regeneration unit 310 may be configured to perform a signal regeneration process with respect to the degraded channels received from WSS 314. In the present example, regeneration unit 310 may have a bandwidth and wavelength parameters that cover the entire transmission band of WDM signal 304. For example, WDM signal 304 may be transmitted in the C-band that may include optical wavelengths between approximately 1525 and 1565 nanometers (nm) such that the bandwidth of the C-band and WDM signal 304 may be approximately 40 nm. Therefore, in the present example, regeneration unit 310 may have a bandwidth of at least 40 nm and may be tuned for wavelengths between approximately 1525 nm and 1565 nm. In some instances the signal regeneration may be an O-E-O regeneration process and in other instances the signal regeneration process may be done in the optical domain without requiring an O-E-O conversion. In instances where optical regeneration is used, regeneration unit 310 may implement a saturable absorber to absorb optical noise or an optical parametric process with a sufficiently high pump power.

As mentioned previously, the bandwidth of signal regeneration unit 310 may be based on the implementation of the regeneration process associated with the modulation format of the signals received by regeneration unit 310. For example, a regeneration unit 310 configured to perform signal regeneration on 400 G signals may have a bandwidth that may depend on the implementation of the regeneration process used for 400 G signals. Similarly, a regeneration unit 310 configured to perform signal regeneration on 100 G signals may have a bandwidth that may depend on the implementation of the regeneration process used for 100 G signals.

Accordingly, a whether or not regeneration unit 310 has a bandwidth of the entire transmission band of WDM signal 304 may depend on whether an implementation of the regeneration process for the associated modulation format has a large enough bandwidth. In instances where the bandwidth of a signal regeneration unit 310 is less than the entire transmission band associated with WDM signal 304, an alternative embodiment of a network element may be chosen. An example alternative embodiment is described with respect to FIG. 4.

In the present example, because regeneration unit 310 may have a bandwidth that may cover the entire transmission band of WDM signal 304, regeneration unit 310 may be configured to receive any appropriate channel of WDM signal 304. For example, channel $\lambda_2$ of WDM signal 304 may be degraded, as determined by performance monitoring of WDM signal 304. Controller 311 may instruct WSS 314 to direct channel $\lambda_2$ to regeneration unit 310 regardless of the actual wavelength of channel $\lambda_2$ because regeneration unit 310 may have a bandwidth that covers the entire transmission band of WDM signal 304. In contrast, if the bandwidth of regeneration unit 310 did not cover the entire transmission band, correction unit 306 may include a plurality of regeneration units each configured for a portion of the transmission band of WDM signal 304. In such instances, correction unit 306 may direct $\lambda_2$ to the regeneration unit associated with the wavelength of channel $\lambda_2$. FIG. 4 illustrates such an embodiment.

Following performance monitoring and regeneration of one or more channels of WDM signal 304, signal correction unit 306 may direct WDM signal 304 to ROADM card 312b, which may be configured to direct WDM signal 304 and its associated channels to their intended destinations from network element 302. For example, ROADM card 312b may direct one or more channels of WDM signal 304 to another network element and/or may add or drop one or more channels associated with WDM signal 304. Therefore, each WDM signal 304 received at network element 302 may be monitored and degenerated channels associated with WDM signal 304 may be regenerated based on the performance monitoring, reach of the channels, and the intended destination of one or more of the channels of WDM signal 304. As such, the auto-regeneration of WDM signal 304 by network element 302 may allow for implementation of an optical network with a reduced number of fixed signal regeneration points based on the intended destination of WDM signal 304 and other design parameters of the optical network.

Modifications, additions or omissions may be made to network element 302 without departing from the present disclosure. For example, network element 302 may include other components and devices configured to perform other functions not described. Additionally, more or fewer components than those explicitly shown may be used to perform the operations described herein. Further, although automatic signal regeneration is described with respect to regenerating a signal for continued propagation throughout an optical network, auto-regeneration may be applied before an optical receiver to improve the quality of the signal received at the receiver. Therefore the information carried by the signal may be more easily extracted at the receiver. Additionally, in some instances signal correction unit 306 may include a plurality of signal regeneration units 310 with bandwidths associated with a portion of the transmission band of WDM signal 304 as disclosed in FIG. 4. Also, signal correction unit 306 may include a set of one or more regeneration units 310 associated with one signal type and its associated modulation format (e.g., 400 G signals) and another set of one or more regeneration units 310 associated with another signal type and its associated modulation format (e.g., 100 G signals). Further, although network element 302 has been described in the context of a ROADM, it is understood that correction unit 306 may be implemented in any other suitable type of network element also.

FIG. 4 illustrates a network element 402 with components configured to perform partial-band performance monitoring and signal correction, in accordance with some embodiments of the present disclosure. Network element 402 may be a ROADM and may be configured to receive a WDM signal 404 at a ROADM card 412a and determine whether or not to perform signal regeneration of one or more channels of WDM signal 404 before communicating WDM signal 404 to its intended destination from network element 402 via a ROADM card 412b. WDM signal 404 may be substantially similar to WDM signal 304 of FIG. 3.

In the present example, WDM signal 404 may be received from ROADM card 412a by an optical signal correction unit 406 of network element 402. Signal correction unit 406 may be configured to monitor the optical performance of WDM signal 404 and perform regeneration of WDM signal 404 based on the measured signal performance. Correction unit 406 may include an optical performance monitoring (OPM) unit 408, a wavelength selective switch (WSS) 414, and an optical signal regeneration unit 410.

In the present example, OPM 408 may be configured to monitor PMD, OSNR or any other applicable performance characteristic of WDM signal 404. In some instances, OPM 408 may be configured to monitor the performance of all of WDM signal 404, a subset of channels of WDM signal 404 or each individual channel ($\lambda_i$) of WDM signal 404.

In the present example, OPM 408 may include a demultiplexer 418 configured to divide WDM signal 404a into its individual channels ($\lambda_i$) and direct each channel to a channel performance monitoring (CPM) unit 409. Each CPM unit 409 may be configured to monitor one or more performance characteristics of its respective channel. In some instances each CPM 409 may include an individual controller or one or more controllers of OPM 408 may control one or more CPMs 409.

In the present embodiment, each CPM 409 may monitor one or more performance characteristics of its respective channel (e.g., OSNR, PMD, etc.). Correction unit 406 may include a controller 411 communicatively coupled to OPM 408 and each CPM 409. Controller 411 may be similar to controller 311 of FIG. 3 and may compare one or more of the performance characteristics as measured by a CPM 409 with a threshold value associated with the channel of the CPM 409. If a performance characteristic does not meet the threshold value, controller 411 may communicate a control signal to WSS 414 such that WSS 414 separates the degraded channel from WDM signal 404 and directs the degraded channel to a signal regeneration unit 410.

For example, CPM 409b may receive channel $\lambda_2$ of WDM signal 404a and controller 411 may determine that channel $\lambda_2$ may be sufficiently degraded such that regeneration of channel $\lambda_2$ may be desired based on the measured performance characteristic. Accordingly, controller 411 may communicate a control signal to WSS 414 such that WSS 414 separates channel $\lambda_2$ from WDM signal 404a and directs channel $\lambda_2$ to one of regeneration units 410.

Regeneration units 410 may be configured to perform a signal regeneration process with respect to the degraded channels received from WSS 414. As mentioned above, in the present example, a regeneration unit 410 may have a bandwidth that may cover a portion of the entire bandwidth of WDM signal 404. Accordingly, signal correction unit 406 may include a plurality of regeneration units 410 configured to regenerate signals within a particular bandwidth of the full transmission band of WDM signal 404 such that signals associated with each channel within the entire bandwidth of WDM signal 404 may be regenerated.

For example, WDM signal 404 may be transmitted in the C-band that may include optical wavelengths between approximately 1525 and 1565 nanometers (nm) such that the bandwidth of the C-band and WDM signal 404 may be approximately 40 nm. Additionally, each regeneration unit 410 may have a bandwidth of approximately 14 nm. Accordingly, correction unit 406 may include a regeneration unit 410a, a regeneration unit 410b and a regeneration unit 410c each having a bandwidth of approximately 14 nm. Regeneration unit 410a may be configured to regenerate optical signals having wavelengths between approximately 1524 nm and 1538 nm, regeneration unit 410b may be configured to regenerate optical signals having wavelengths between approximately 1538 nm and 1552 nm and regeneration unit 410c may be configured to regenerate optical signals having wavelengths between 1552 nm and 1566 nm. Therefore, regeneration units 410a, 410b, and 410c may cover the entire optical spectrum of WDM signal 404. Additionally, the wavelengths associated with each regeneration unit 410 may be configured such that a single channel is not split between regeneration units. For example, the wavelengths of the regeneration units 410 may overlap in some embodiments to account for this.

It is understood that the above is merely an example and that any number of regeneration units 410 may be used depending on the bandwidth of the regeneration units used and the optical spectrum of the transmission band of WDM signal 404. For example, in alternative embodiments, regeneration unit 410 may include a plurality of regeneration units 410 with each associated with the wavelength of each individual channel of WDM signal 404.

Upon receiving a degraded channel (e.g., channel $\lambda_2$) from WSS 414, signal correction unit 406 may direct the channel to the regeneration unit 410 configured for the particular wavelength of the channel. For example, if the wavelength of channel $\lambda_2$ is 1530 nm and regeneration unit 410a is configured for wavelengths between approximately 1524 nm and 1538 nm, signal correction unit 406 may direct degraded channel $\lambda_2$ to regeneration unit 410a. As another example, if correction unit 406 includes a regeneration unit 410 for each channel, correction unit 406 may direct channel $\lambda_2$ to the regeneration unit 410 associated with channel $\lambda_2$. In the present example, correction unit 406 may include an optical demultiplexer 420 configured to receive an optical signal associated with a degraded channel and based off of the wavelength of that channel, direct the optical signal to the appropriate regeneration unit 410.

Regeneration units 410 may comprise any suitable system, apparatus, or device configured to regenerate the degraded optical signals based on any appropriate regeneration process. In some instances, a regeneration unit 410 may use an O-E-O conversion and in other instances a regeneration unit 410 may perform optical regeneration in the optical domain and not the electrical domain such that it does not use O-E-O conversion. As mentioned above, the particular regeneration process may depend on the particular modulation format of the signal. In the present embodiment, upon regenerating a degraded signal, each regeneration unit 410 may direct the regenerated signal to an optical multiplexer 421 that may be configured to combine the regenerated signals received from regeneration units 410. Multiplexer 421 may direct the combined signals back to WSS 414, which may recombine the regenerated signals with WDM signal 404. In the present example it can be seen that the signal associated with channel $\lambda_2$ of WDM signal 404b is no longer degraded.

Following receiving the channels of WDM signal 404 from OPM 408 or MUX 421, WSS 414 may direct WDM signal 404 to ROADM card 412b, which may be configured to direct regenerated WDM signal 404 to another network element, and/or add or drop one or more channels associated with WDM signal 404. Accordingly, network element 402 may be configured to monitor performance characteristics of one or more channels of WDM signal 404 and regenerate one or more degraded signals associated with channels of WDM signal 404 based on the measured performance characteristics.

Modifications, additions or omissions may be made to network element 402 without departing from the present disclosure. For example, network element 402 may include other components and devices configured to perform other functions not described. Additionally, more or fewer components than those explicitly shown may be used to perform the operations described herein. Also, although automatic signal regeneration is described with respect to regenerating a signal for continued propagation throughout an optical network, auto-regeneration may be applied before an optical receiver to improve the quality of the signal received at the receiver. Therefore the information carried by the signal may be more easily extracted at the receiver. Also, signal correction unit 406 may include a set of one or more regeneration units 410 associated with one signal type and its associated modulation format (e.g., 400 G signals) and another set of one or more regeneration units 410 associated with another signal type and its associated modulation format (e.g., 100 G signals). Further, although network element 302 has been described in the context of a ROADM, it is understood that correction unit 306 may be implemented in any other suitable type of network element also.

Figure 5:
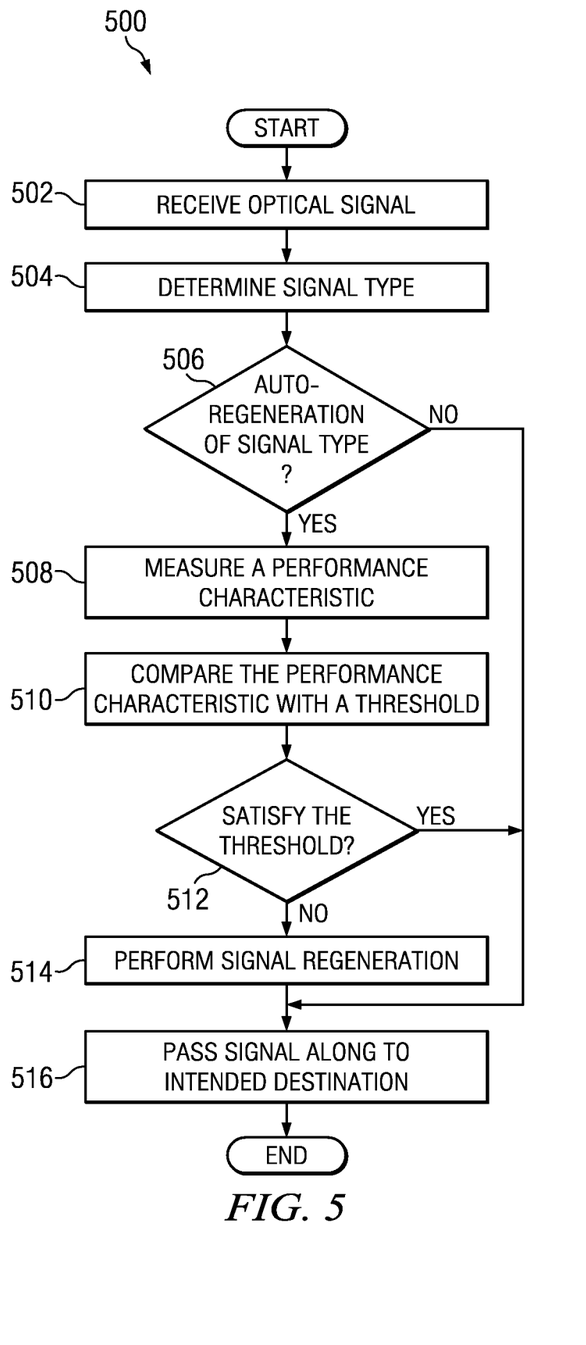
FIG. 5 illustrates an example method 500 for performing automatic regeneration of optical signals in accordance with some embodiments of the present disclosure.

FIG. 5 illustrates an example method 500 for performing automatic regeneration of optical signals in accordance with some embodiments of the present disclosure. Method 500 may be performed by a signal correction unit of a network element (e.g., a signal correction unit 306 or 406 of network elements 302, or 402 of FIGS. 3, and 4, respectively) of an optical network.

Method 500 may start and at step 502 a signal correction unit of a network element may receive an optical signal. At step 504, the signal correction unit may determine the signal type (e.g., 100 G signal, 400 G signal, etc.).

At step 506 the signal correction unit may determine whether the network element is configured to perform automatic regeneration with respect to the signal type. If the correction unit is configured to perform automatic regeneration for the signal type, method 500 may proceed to step 508, otherwise method 500 may proceed to step 516. For example, the network element may be configured to perform signal regeneration for 400 G signals but not 100 G signals. Therefore, if the signal received at step 502 is a 100 G signal, method 500 may proceed to step 516 from step 506, but if the signal received at step 502 is a 400 G signal, method 500 may proceed to step 508 from step 506.

At step 508, the correction unit may measure a performance characteristic of the optical signal (e.g., OSNR) and at step 510 may compare the performance characteristic with a threshold associated with the performance characteristic. As mentioned above, the threshold may be based on the reach of the optical signal, the distance to the next network element that is to receive the optical signal from the current network element, the fibers connecting the two network elements, the eye-opening associated with the optical signal, the BER, etc.

At step 512, the correction unit may determine whether the measured performance characteristic satisfies the threshold, if no, method 500 may proceed to step 514, otherwise method 500 may proceed to step 516. At step 514, the correction unit may perform signal regeneration on the optical signal. In some instances the regeneration may be done in the optical domain without O-E-O regeneration. After signal regeneration at step 514, method 500 may proceed to step 516.

At step 516, the network element with the signal correction unit may pass the signal along to an intended destination from the network element. The intended destination may be another network element or the optical signal may be dropped from the network such that the intended destination may be a receiver configured to extract the information modulated on the signal. Following step 516 method 500 may end.

Therefore method 500 may be used to dynamically monitor and regenerate optical signals instead of using a traditional static, preset regeneration method. Dynamic monitoring and regeneration may allow for more flexibility and ease in implementing new optical networks and in upgrading existing optical networks to handle new signal types.

Modifications, additions, or omissions may be made to method 500 without departing from the scope of the present disclosure. Each step described may include additional substeps. For example, the optical signal may be associated with a channel of a WDM signal and may be separated from the WDM signal before having signal regeneration performed. Additionally, some steps may be skipped. For example, in some instances each optical signal within an optical network may include the same signal type, such that determining the signal type may be skipped. Additionally, in some instances every signal that is associated with a signal type for which regeneration may be performed may be regenerated without measuring a performance characteristic of the signal and comparing the measured characteristic with a threshold to determine whether or not to perform signal regeneration.

Although the present disclosure and its advantages have been described in detail, it should be understood that various changes, substitutions and alterations can be made herein without departing from the spirit and scope of the disclosure as defined by the following claims.

What is claimed is:

1. A method for regenerating an optical signal comprising:
receiving an optical signal at a network element;
measuring a performance characteristic of the optical signal;
determining a modulation format of the optical signal;
determining that the optical signal needs regeneration based on the performance characteristic of the optical signal; and
performing signal regeneration of the optical signal based on the determination that the optical signal needs regeneration and based on the modulation format of the optical signal.

2. The method of claim 1, wherein the optical signal comprises a channel of a transmission band associated with an optical network.

3. The method of claim 1, wherein the optical signal comprises one of a plurality of channels of a wavelength division multiplexed (WDM) signal.

4. The method of claim 1, wherein performing signal regeneration comprises at least one of compensating for polarization dependent loss, compensating for chromatic dispersion, amplifying signal power of the optical signal, removing amplitude spontaneous emission, removing phase noise and correcting the signal clock.

5. The method of claim 1, wherein performing signal regeneration comprises performing a partial transmission band regeneration process with respect to a transmission band associated with the optical signal.

6. The method of claim 1, wherein performing signal regeneration comprises performing a channel-based regeneration process with respect to a transmission band associated with the optical signal.

7. The method of claim 1, wherein performing signal regeneration comprises performing a full transmission band regeneration process with respect to a transmission band associated with the optical signal.

8. The method of claim 1, further comprising:
comparing the performance characteristic with a threshold value associated with the performance characteristic; and
determining that the optical signal needs regeneration based on the comparison between the performance characteristic and the threshold value.

9. The method of claim 8, further comprising determining the threshold value based on a reach of the optical signal and an intended destination of the optical signal.

10. The method of claim 1, wherein measuring the performance characteristic comprises at least one of measuring polarization mode dispersion (PMD) of the optical signal, an optical signal to noise ratio (OSNR) of the optical signal, phase noise of the optical signal, a bit error rate (BER) of the optical signal, an eye-opening associated with the optical signal, and chromatic dispersion of the optical signal.

11. The method of claim 1, further comprising performing signal regeneration using a signal regeneration process that performs optical signal regeneration in the optical domain.

12. A network element comprising:
an optical performance monitor (OPM) configured to measure a performance characteristic of an optical signal;
an optical signal regeneration unit communicatively coupled to the OPM and configured to perform signal regeneration of the optical signal;
a controller communicatively coupled to the OPM and signal regeneration unit and configured to:
determine a modulation format of the optical signal;
determine that the optical signal needs regeneration based on the performance characteristic of the signal and based on the modulation format of the optical signal; and
direct the optical signal from the OPM to the regeneration unit based on the determination that the optical signal needs regeneration.

13. The network element of claim 12, wherein the optical signal comprises a channel of a transmission band associated with an optical network.

14. The network element of claim 12, wherein the optical signal comprises one of a plurality of channels of a wavelength division multiplexed (WDM) signal.

15. The network element of claim 12, wherein the regeneration unit is configured to perform at least one of compensating for polarization dependent loss, compensating for chromatic dispersion, amplifying signal power of the optical signal, removing amplitude spontaneous emission, removing phase noise and correcting the signal clock.

16. The network element of claim 12, wherein the regeneration unit is configured to perform a partial transmission band regeneration process with respect to a transmission band associated with the optical signal.

17. The network element of claim 12, wherein the regeneration unit is configured to perform a channel-based regeneration process with respect to a transmission band associated with the optical signal.

18. The network element of claim 12, wherein the regeneration unit is configured to perform a full transmission band regeneration process with respect to a transmission band associated with the optical signal.

19. The network element of claim 12, wherein the controller is further configured to:
compare the performance characteristic with a threshold value associated with the performance characteristic; and
determine that the optical signal needs regeneration based on the comparison between the performance characteristic and the threshold value.

20. The network element of claim 19, wherein the threshold value is based on a reach of the optical signal and an intended destination of the optical signal.

21. The network element of claim 12, wherein the OPM is configured to measure at least one of polarization mode dispersion (PMD) of the optical signal, an optical signal to noise ratio (OSNR) of the optical signal, phase noise of the optical signal, a bit error rate (BER) of the optical signal, an eye-opening associated with the optical signal, and chromatic dispersion of the optical signal.

22. The network element of claim 12, wherein the regeneration unit is configured to perform optical signal regeneration in the optical domain.

* * * * *